March 23, 1965  W. R. SWOISH ETAL  3,175,148
STATIONARY INDUCTION APPARATUS UNIT
Filed Jan. 30, 1959  6 Sheets-Sheet 1
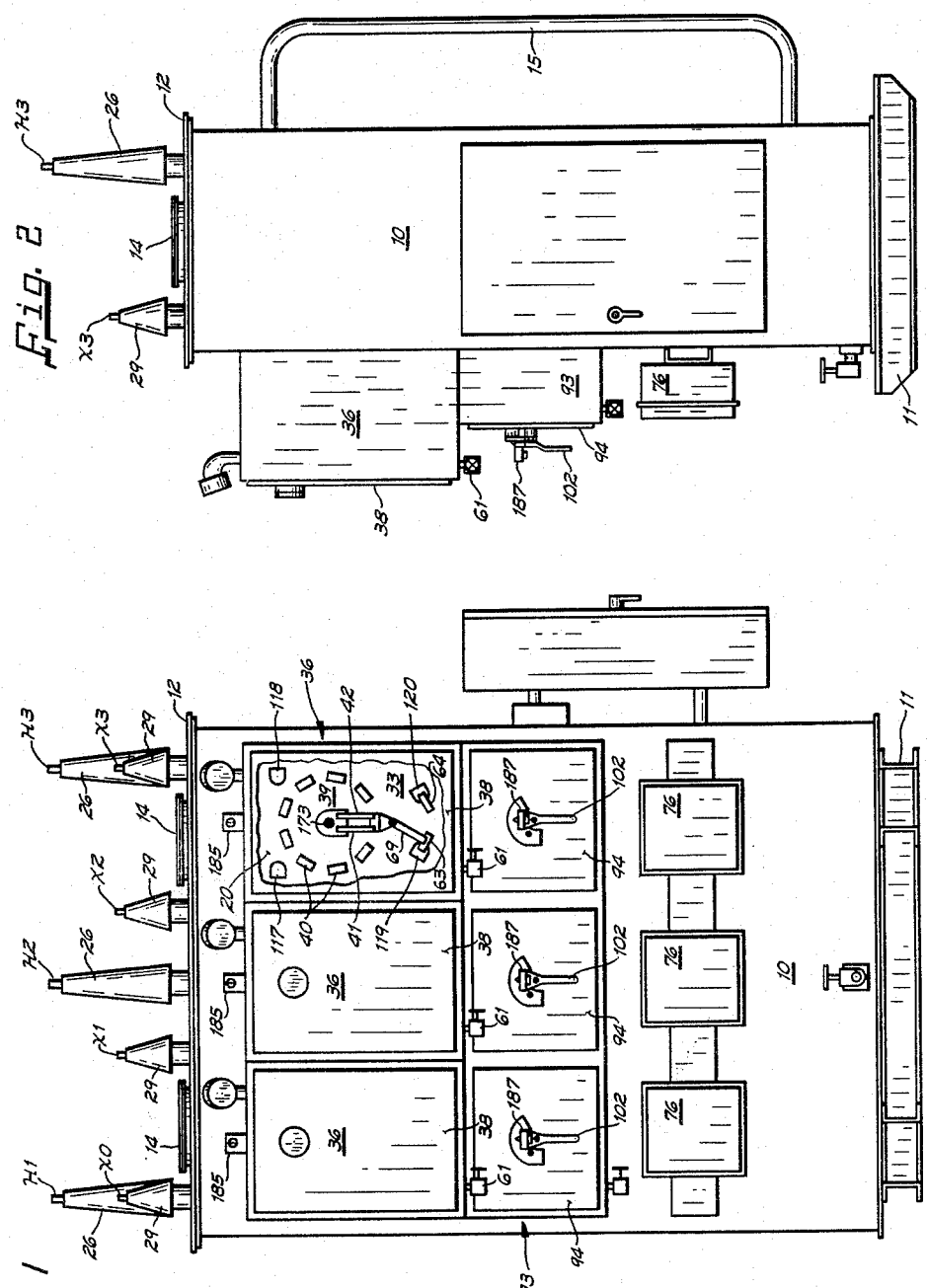
INVENTORS.
William R. Swoish
Gordon A. Wilson Jr.
BY
Lee H. Kaiser
Attorney

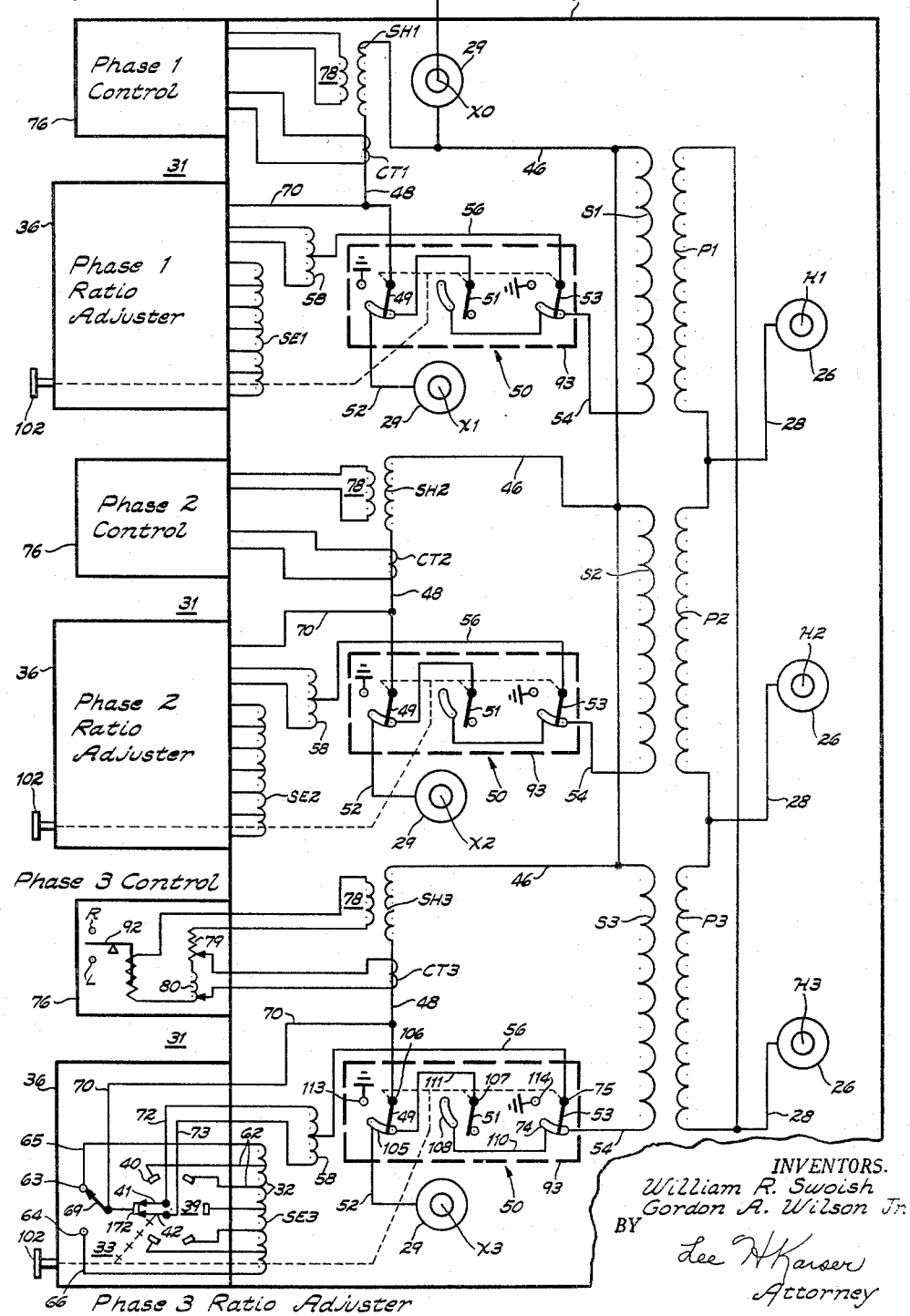

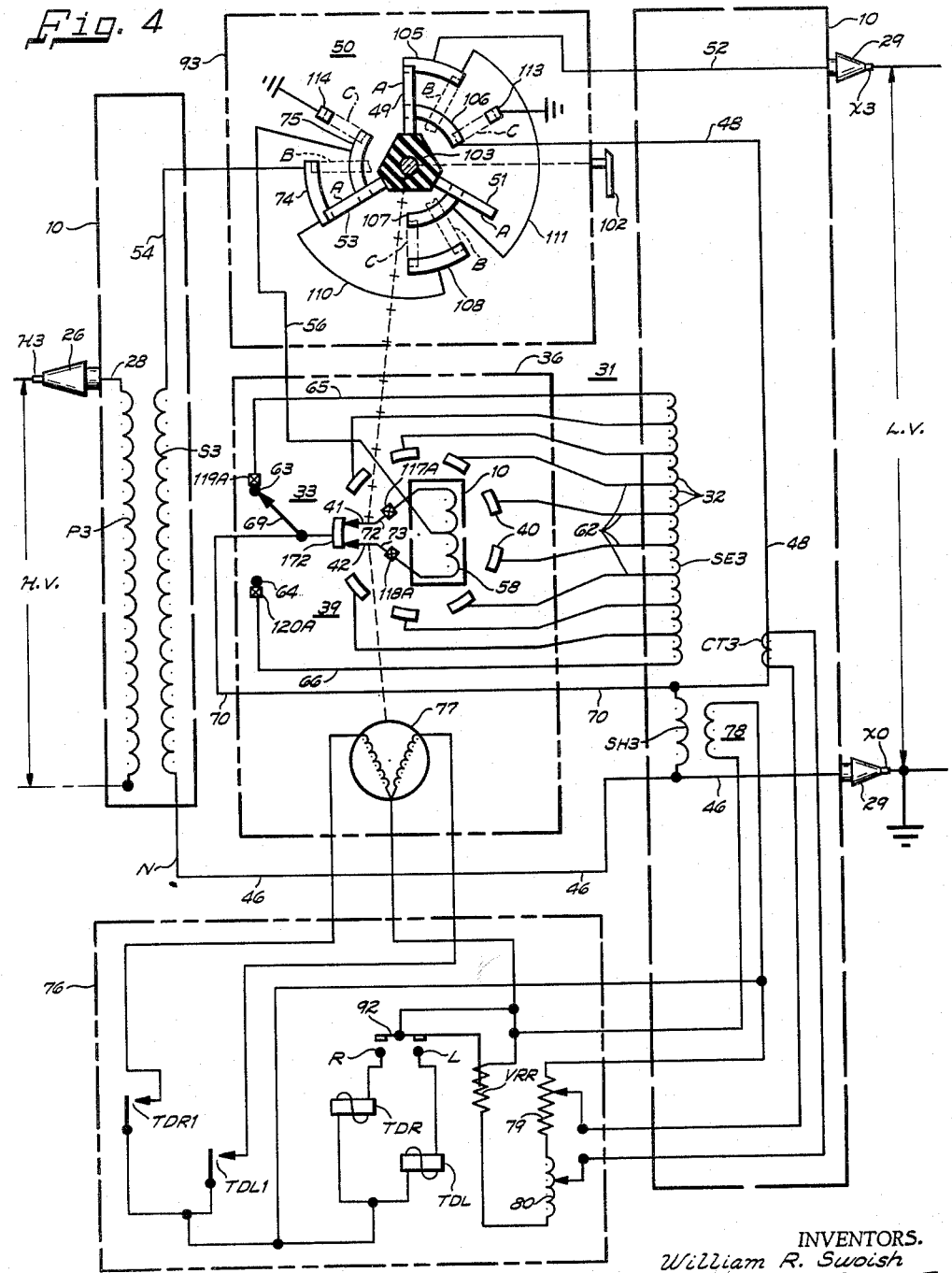

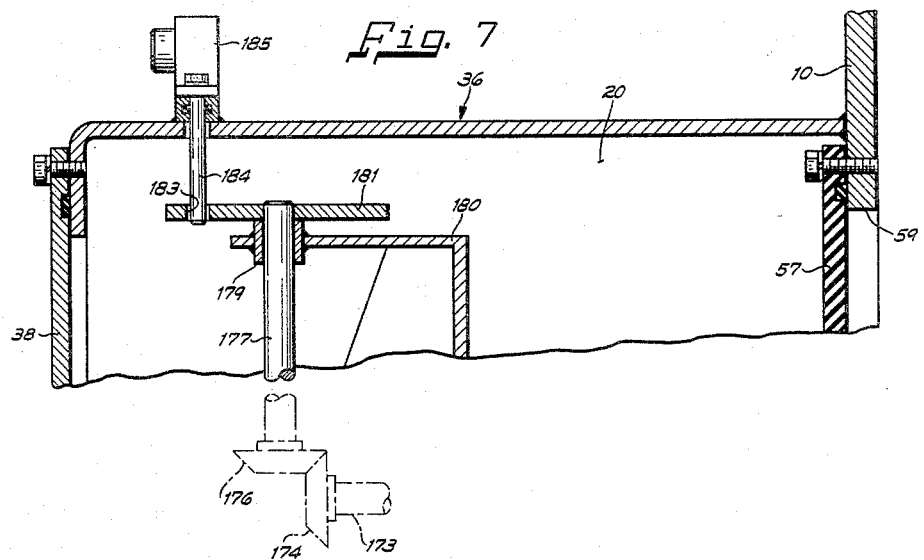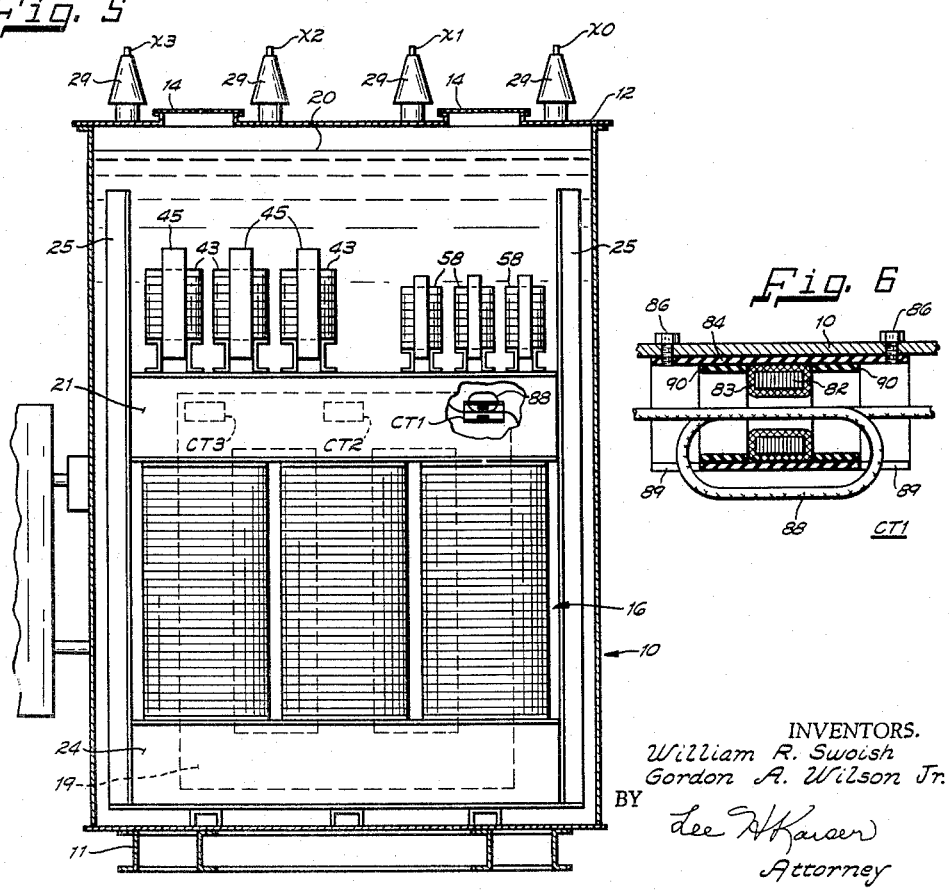

March 23, 1965 W. R. SWOISH ETAL 3,175,148
STATIONARY INDUCTION APPARATUS UNIT
Filed Jan. 30, 1959 6 Sheets-Sheet 6
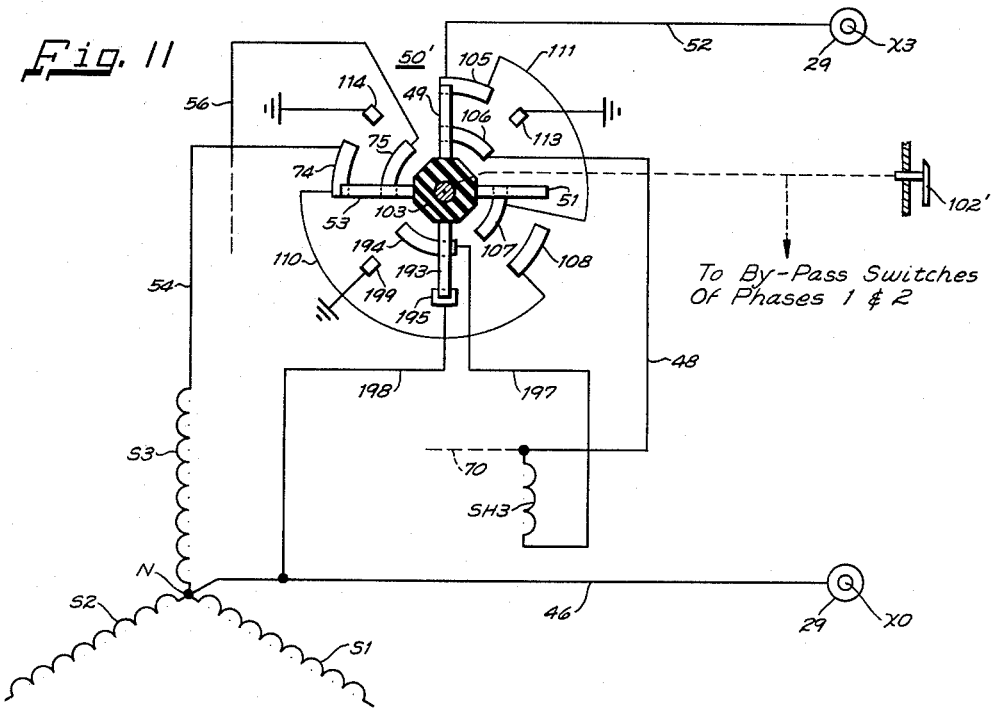
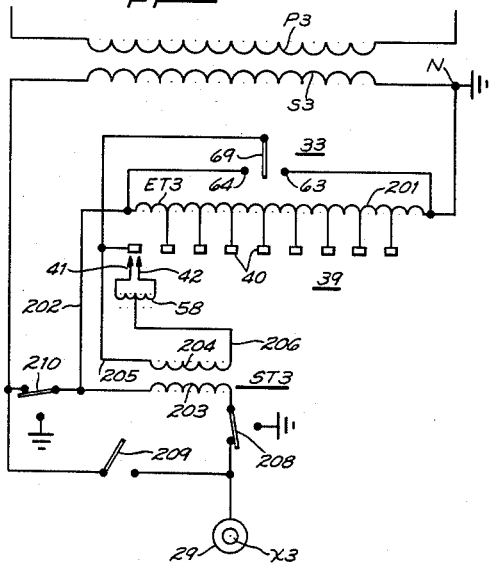
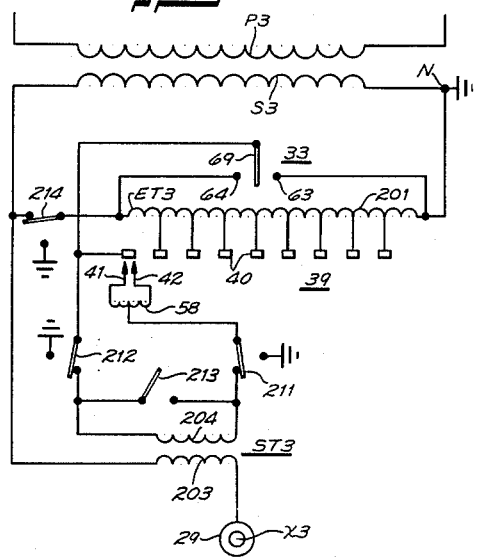
INVENTORS.
William R. Swoish
Gordon A. Wilson Jr.
BY Lee H. Kaiser
Attorney United States Patent Office 3,175,148
Patented Mar. 23, 1965

3,175,148
STATIONARY INDUCTION APPARATUS UNIT
William R. Swoish, Bridgeville, and Gordon A. Wilson, Jr., Washington, Pa., assignors to McGraw-Edison Company, Milwaukee, Wis., a corporation of Delaware
Filed Jan. 30, 1959, Ser. No. 790,103
38 Claims. (Cl. 323—43.5)

This invention relates to stationary induction apparatus and in particular to stationary induction apparatus having voltage regulation.

Individual phase regulation of three phase power transformers up to approximately 5000 kva. size is conventionally accomplished in a station having separately mounted, step type, single phase regulators. Single phase regulators of the step type usually have a relatively large and bulky casing filled with a liquid dielectric and housing a core and coil assembly and a ratio adjuster. Separate concrete pads, or pedestals, are provided for mounting the three single phase regulators, and some type of structural iron framework is required to mount the air disconnect by-pass switches utilized to remove the single phase regulators from the power system for maintenance without interrupting customer service. Such separately mounted three phase transformer, single phase regulators, air disconnect by-pass switches and other auxiliaries continually exposed to the weather require a relatively large station and necessitate considerable maintenance.

It is an object of the invention to provide a three phase stationary induction apparatus having single phase regulation wherein all of the components are within a single self-contained unit.

It is a further object of the invention to provide a unitary, three phase, stationary induction apparatus wherein the magnetic core means and the primary and secondary coils of all three phases linking said core means, the autotransformer core and coil assemblies for the three single phase voltage regulating means including shunt and tapped series windings, the tap changers for all three phases, reversing switches for all three phases, bridging reactors for all three phases, by-pass switches for all three phases, current and potential transformers for all three phases, and, if necessary, series transformers for all three phases are all sealed from the atmosphere and insulated by a dielectric fluid within a single self-contained unit.

Another object of the invention is to provide unitary three phase stationary induction apparatus having a single phase regulation which permits one-piece installation on a single foundation and occupies considerably less space than conventional apparatus having separately mounted single phase regulators and separately mounted by-pass switches.

Still another object of the invention is to provide a unitary stationary induction apparatus having ratio adjusting means for each phase and enclosing novel by-pass means for each phase which is insulated by dielectric fluid and is only required to interrupt exciting current and consequently can be sufficiently smaller than conventional air disconnect by-pass switches to permit installation of by-pass means for each phase in a self-contained unit.

A still further object of the invention is to provide unitary, self-contained stationary induction apparatus including voltage regulating means for each phase and housing a switch for each phase operable from the exterior of said apparatus to disconnect and ground the regulating windings of said phase and to establish a by-pass circuit which permits continued loading of the stationary induction apparatus without voltage regulation.

A still further object of the invention is to provide a one-piece stationary induction apparatus with voltage regulating means and a by-pass switch for each phase wherein the voltage regulating means and by-pass switches are interlocked to prevent the by-pass switch from rupturing circulating current resulting from adjacent taps being bridged.

Safe inspection and maintenance of the regulating mechanism of a conventional power transformer having on-load voltage regulating equipment wherein tap changers of all three phases are simultaneously actuated has heretofore been impossible without de-energizing the transformer. Even when the load tap changing apparatus is on neutral, the shunt winding is in the circuit and the series transformer is energized, and consequently it has been necessary in the past to either interrupt customer service or to switch the load to an alternate power source when the load tap changing contacts and drive mechanism were to be inspected or repaired. Further, it was necessary heretofore for utilities to follow elaborate safety precautions before permitting personnel to inspect or maintain prior art power transformers having load tap changing equipment.

It is another object of the invention to provide a unitary three phase stationary induction apparatus which provides individually controlled voltage regulation for each phase. A further object is to provide such a three phase stationary induction apparatus having single phase regulation which allows safe inspection and maintenance of the load tap changing equipment while the stationary induction apparatus remains energized and continues to deliver uninterrupted three phase power.

A still further object of the invention is to provide such unitary stationary induction apparatus having novel means to disconnect and ground and regulating windings, thereby positively protecting maintenance personnel.

Still another object of the invention is to provide such one-piece stationary induction apparatus having novel means to protect personnel during inspection and repair of load tap changing apparatus in ungrounded neutral systems.

Another object of the invention is to provide such unitary stationary induction apparatus having grounding lug means accessible from the exterior of the apparatus which permit connecting external grounds to all the windings associated with the regulating circuit and thus give visual assurance of complete safety for maintenance personnel.

These and other objects and advantages of the invention will be more apparent from the following detailed description when taken in conjunction with the accompanying drawing wherein:

FIGS. 1 and 2 are front and side elevation views respectively of a preferred embodiment of three phase power transformer unit embodying the invention, a portion of the walls being broken away in FIG. 1 to illustrate the position of the elements;

FIG. 3 is a simplified schematic circuit diagram of the three phase transformer unit of FIGS. 1 and 2;

FIG. 4 is a schematic circuit diagram of a single phase of the transformer unit of FIGS. 1 and 2 showing the normal, or open, position of the by-pass switch in solid lines and the by-pass and grounded positions in dotted lines;

FIG. 5 is a vertical sectional view through the preferred embodiment of FIGS. 1 and 2;

FIG. 6 is a partial view showing the current transformer for the line-drop compensation control means;

FIG. 7 is a detail view illustrating a preferred means for interlocking the by-pass switch and the load ratio adjuster;

FIG. 11 is a partial circuit diagram of a by-pass switch for each phase of unitary stationary induction apparatus for an ungrounded neutral, three phase power system; and, FIGS. 12 and 13 are simplified circuit diagrams for by-pass switches in stationary induction apparatus having voltage regulating means of the two-core type including a series transformer.

Figure 8:
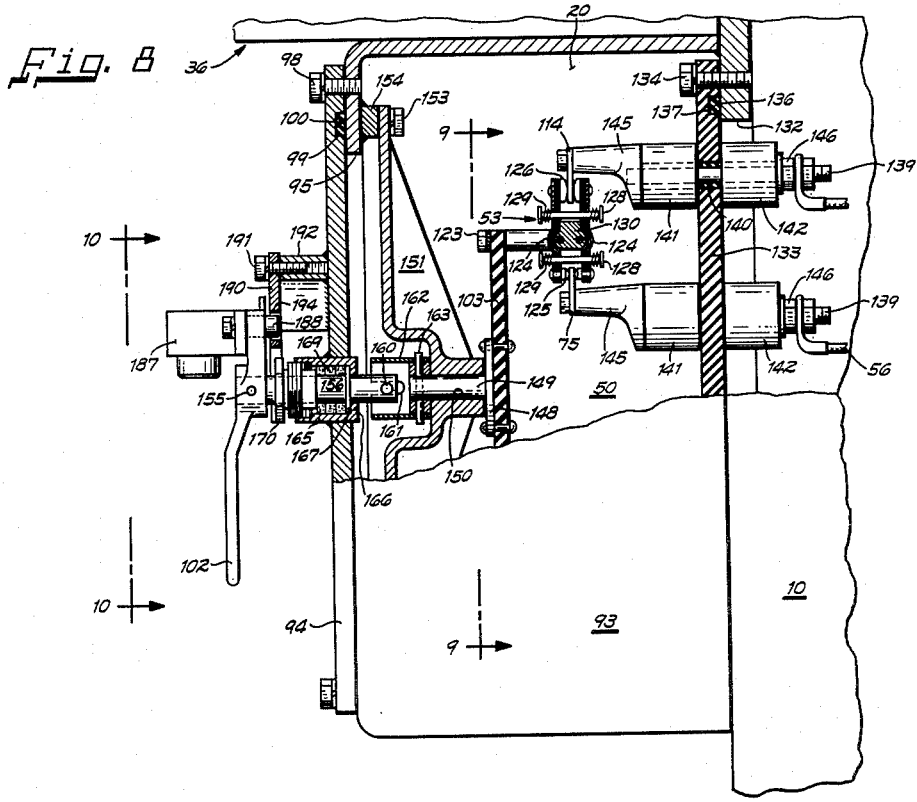
FIG. 8 is a partial vertical sectional view through one of the by-pass switches.

Referring to the drawing, a preferred embodiment of the self-contained three phase stationary induction unit of the invention includes a transformer casing 10 of rectangular horizontal cross section resting upon a base 11 constructed of channel iron members. The open end of tank 10 is sealed by a cover 12 having manholes therethrough which are closed by manhole covers 14. Cooling tubes 15 in communication with the interior of tank 10 at the upper and lower ends thereof provide efficient convection cooling of a three phase transformer core and coil assembly 16 (see FIG. 5) having delta connected primary windings P1, P2, and P3 and Y-connected secondary windings S1, S2 and S3 inductively related thereto linking a three-legged magnetic core 19 and immersed in an insulating and cooling dielectric 20 which can be gaseous or a liquid such as a transformer oil within casing 10. Upper channel iron side frame members 21 disposed on opposite sides of the upper yoke of three-legged magnetic core 19 and lower channel iron side frame members 24 on opposite sides of the lower yoke of core 19 are secured at their ends to vertical angle iron columns 25.

Terminals H1, H2, and H3 on primary bushings 26 mounted on cover 12 are connected by conductors 28 (see FIG. 3) to the three delta connected primary phase windings P1, P2, and P3, respectively, of the transformer core and coil assembly 16. Terminals X0, X1, X2, and X3 on secondary bushings 29 mounted in spaced apart relation on cover 12 permit connection of the low voltage side of the three phase transformer unit to the load. Single phase voltage regulating means 31 are normally connected between the secondary bushing terminals X1, X2 and X3 and the Y-connected phase secondary windings S1, S2 and S3, respectively, of the transformer core and coil assembly 16 as described hereinafter, and in the embodiment of FIGS. 1–10 the secondary transformer bushing terminal X0 is connected to ground and the neutral N of the Y-connected phase secondary windings S1, S2, and S3.

The three single phase voltage regulating means 31 are provided on the low voltage side of the three phase transformer unit, one being associated with each of the phases. Each single phase voltage regulating means 31 is shown as being of the step, single-core, ratio adjuster, autotransformer type having a series winding SE and a shunt winding SH with taps 32 located in series winding SE for changing the ratio of transformation between the source and load sides of the regulator 31, i.e., between the series winding SE and the shunt winding SH, by increasing or decreasing the number of active turns in one winding with respect to the other and a reversing switch 33 to obtain "buck" or "boost" by reversing the connections to the series winding SE. Three individually sealed compartments 36 on one sidewall of tank 10 contain insulating dielectric fluid 20. Each compartment 36 houses a ratio adjuster, or tap changing device, 39 and a reversing switch 33 for one of the phases immersed in the insulating dielectric 20. In FIG. 1 the door 38 affording access to the interior of one compartment 36 is broken away to illustrate the reversing switch 33, the stationary contacts 40 of the ratio adjuster 39 arranged in a circle, and the movable contacts 41 and 42 of the ratio adjuster 39 adapted to sequentially engage the stationary contacts 40. Three regulator core and coil assemblies 43 (see FIG. 5), one associated with each of the phases and including a magnetic core 45 linked by a shunt winding SH and a tapped series winding SE, are immersed in the insulating dielectric 20 within casing 10 and mounted on the upper side frame members 21 above the three phase transformer core and coil assembly 16.

The voltage regulating means 31 of all three phases are identical and only that for phase 3 is illustrated in detail in the drawing and described herein. The voltage regulator core and coil assembly 43 of phase 3 includes the shunt winding SH3 and the series winding SE3 linking a magnetic core 45. The shunt winding SH3 is connected at one end by a conductor 46 to the grounded neutral N (see FIG. 3) of the phase secondary windings S1, S2 and S3 and to the grounded neutral terminal X0 on a bushing 29. The opposite end of shunt winding SH3 is connected by a conductor 48 through a movable contact 49 of a by-pass switch 50 and a conductor 52 to bushing terminal X3. One end of the phase secondary winding S3 of the three phase transformer core and coil assembly 16 is connected through a conductor 54, the movable contact 53 of by-pass switch 50, and a conductor 56 to the mid-tap of a bridging reactor, or preventive autotransformer 58 immersed in the insulating dielectric 20 within the tank 10 and mounted on the upper side frame members 21 of the transformer core and coil assembly 16. Each of the taps 32 of the series winding SE3 is connected to a single one of a plurality of circumferentially arranged stationary contacts 40 of the tap changing device, or ratio adjuster 39 immersed in the insulating dielectric 20 within compartment 36.

The insulating dielectric 20 within compartment 36 is isolated from that within tank 10, and consequently sparking at the contacts of tap changer 39 within compartment 36 cannot contaminate the dielectric 20 within tank 10. The transformer oil 20 within compartment 36 can be drained and changed independently of that within tank 10 by opening drain valve 61 to permit maintenance and repair of the tap changer 39. Electrical leads between the components within tank 10 and elements within compartment 36 are connected to the ends of copper studs (not shown) which extend through a panel board 57 (see FIG. 7) of low power factor, low loss dielectric material which seals the aperture 59 in the tank sidewall registering with the interior of compartment 36 and isolates the interior of tank 10 from the interior of compartment 36. Accordingly, leads 62 connect the taps 32 on series winding SE3 within tank 10 to the stationary contacts 40 on tap changer 39 within compartment 36, the stationary contacts 63 and 64 on reversing switch 33 within compartment 36 are connected by leads 65 and 66 to the opposite ends of series winding SE3 within tank 10; the movable contact 69 of reversing switch 33 is connected by conductor 70 to one end of shunt winding SH3 within tank 10 and by conductors 48 and 52 and movable contact 49 of by-pass switch 50 to secondary bushing terminal X3; and the movable contacts 41 and 42 of tap changer 39 within compartment 36 are connected by leads 72 and 73 to the ends of preventive autotransformer 58 within tank 10.

The reversing switch 33 connects the series winding SE3 and the shunt winding SH3 in either buck or boost relation with each other. The ungrounded end of shunt winding SH3 is normally connected by movable contact 49 of by-pass switch 50 directly across the load side of the single core autotransformer type voltage regulating means 31, i.e., across terminals X3 and X0. The series winding SE3 is normally connected between the source side of the voltage regulating means 31 and the load terminal X3 in a circuit which may be traced from transformer phase winding S3, conductor 54, stationary contact 74 of by-pass switch 50, the movable contact 53 of by-pass switch 50, stationary contact 75 of by-pass switch 50, conductor 56, the mid-tap of preventive autotransformer 58, the leads 72 and 73 (assuming both movable contacts 41 and 42 are on the same stationary contact 40), movable contacts 41 and 42, a stationary contact 40, a conductor 62, a portion of series winding SE3, lead 65, stationary contact 63 of reversing switch 33, movable contact 69 of reversing switch 33, conductor 70, lead 48, stationary contact 106, movable contact 49 of by-pass switch 50, and lead 52 to low voltage bushing terminal X3. The mid-tap of bridging reactor 58 and the movable contact 69 of reversing switch may be considered the ends of the ratio adjusting means.

The voltage on the load side of each phase of the embodiment of FIGS. 1–10 is varied by switching tapped sections of the series winding SE into and out of the circuit. The series winding SE of each phase has nine taps (only six of which are shown in the simplified FIG. 3 diagram) which are connected to circumferentially arranged stationary contacts 40 of the ratio adjuster 39. The tap changing device 39 of each phase is preferably of the type disclosed in U.S. 2,791,648, entitled "Drive Mechanism," in the name of Robert A. Maloney, and having the same assignee as the present application. However, any step type voltage regulator capable of switching sections of a tapped winding into and out of the circuit is satisfactory for accomplishing the results of the invention, and inasmuch as the details of mechanical construction of the tap changers 39 do not constitute part of the present invention, they are omitted from the drawing and the details thereof will not be described.

The turn ratio of each voltage regulating means 31 must be changed without interfering with the load, and the bridging reactor, or preventive autotransformer 58 providing in each phase limits the circulating current to a safe value during the interval that two adjacent stationary contacts 40 are bridged. The movable contacts 41 and 42 of tap changer 39 are spaced in such a relative position as to allow either both movable contacts 41 and 42 to be in the so-called symmetrical position on the same stationary contact 40 or in the so-called bridging position wherein each is on one of two adjacent stationary contacts 40. Thus, during the tap changing interval, one movable contact 41 or 42 is always in contact with a stationary contact 40 and at no time is the full load current broken by the tap changing switch 39. When the movable contacts 41 and 42 are bridging two stationary contacts 40, the voltage obtained is that midway between the two taps.

The reversing switch 33 is adapted to alternately change the connections of the tapped series winding SE3 from "lower" to "raise" and thus double the voltage range of the tap changing device 39 in a manner well known in the art. The movable contacts 41 and 42 are rotatable through two revolutions, and the nine taps on series windings SE3 give 17 full-cycle or 33 half-cycle positions.

A reversible motor 77 (see FIG. 4) preferably of the capacitor type, is located under the insulating dielectric 20 in each compartment 36 to drive the phase tap changing device 39. The electrical control means for the reversible motor 77 are enclosed in control cabinets 76 mounted on the sidewall of casing 10 below the oil-filled compartments 36. Time delay relays TDL and TDR within each control cabinet 76 between the voltage regulating relay VRR and the motor 77 reduce the amount of wear on the tap changing device 39 and prolong the life of the tap changer contacts and the liquid dielectric 20 in which arcing takes place. Time delay relays TDR and TDL are operable to actuate contacts TDR1 and TDL1 which connect a potential coil 78 on the regulator core and coil assembly 43 within casing 10 to the "forward" and "reverse" windings respectively of reversible motor 77 within compartment 36 to selectively drive motor 77 in a forward or reverse direction. In a manner well known in the art, motor 77 actuates movable contacts 41 and 42 of ratio adjuster 39 to make the desired tap changes.

The voltage regulating relay VRR within control cabinet 76 is energized from the voltage derived from the potential coil 78 on the regulating core and coil assembly 43 within the tank 10. The voltage regulating means 31 is adapted to maintain the voltage constant at some predetermined point along the single phase line leading to the load. A conventional line drop compensator includes a variable resistance 79 and a variable reactance 80 within control cabinet 76 connected in a series circuit with the coil of the voltage regulating relay VRR and the potential coil 78. A current transformer CT3 immersed in the insulating dielectric 20 within the main tank 10 derives a current proportional to the load current in conductors 48 and 53 leading to secondary bushing terminal X3. The regulating voltage drops in the two elements 79 and 80 are proportional to the load current of the regulated phase. These two voltage drops are introduced into the voltage regulating relay VRR circuit in series with the voltage proportional to the system voltage at the regulator derived from the potential coil 78. The elements 79 and 80 are variable and can be adjusted so that the voltage regulating means 31 holds a voltage high enough to compensate for the resistance and reactance drops in the phase line leading to the load and thus maintain a constant voltage at a predetermined point along the phase line leading to the load.

As illustrated in FIGS. 5 and 6 the current transformer of each phase preferably comprises an annular core 82 of magnetic material surrounded by turns of a secondary winding 83 and disposed within a tubular support sleeve 84 secured by suitable means illustrated as bolts 86 to the internal surface of one sidewall of tank 10. The conductor 48 carrying the phase load current passes through the axial opening in the core 82 and is looped back through this axial opening to form a one-turn primary winding 88 for the current transformer. The tubular support sleeve 84 is cut away at 89 adjacent its ends parallel to the axis thereof to accommodate the one-turn primary winding 88, and annular members 90 fitting snugly within support sleeve 84 and abutted against opposite sides of secondary winding 83 secure the current transformer in position.

The movable contact 92 of the voltage regulating relay VRR is in a "neutral" position as long as the voltage at the predetermined point is within the voltage bandwidth. When the voltage at this predetermined point is above the upper bandwidth limit, relay VRR actuates movable contact 92 into engagement with stationary contact L which completes an operating circuit to time delay relay TDL from potential coil 78. Relay TDL operates to close its normally open contacts TDL1 and connect coil 78 to the corresponding winding on reversible motor 77 and thus drive motor 77 in a direction which actuates movable contacts 41 and 42 of tap changer 39 to lower the ratio of transformation between shunt winding SH3 and series winding SE3. In a similar manner, when the voltage at the predetermined point on the phase line leading to the load is below the lower limit of the voltage bandwidth, relay VRR actuates movable contact 92 into engagement with contact R to complete an operating circuit to time delay relay TDR.

A sealed enclosure 93 supported on the sidewall of tank 10 immediately below the compartments 36 and filled with insulating dielectric 20 houses the by-pass switches 50 for the three phases. Three doors 94 (see FIG. 8) closing apertures 95 in the front wall of enclosure 93 provide access to the by-pass switches 50. Each door 94 is releasably secured to enclosure 93 by bolts 98, and a continuous resilient gasket 99 within a groove 100 on the inner surface of door 94 and surrounding aperture 95 is compressed between door 94 and the front wall of enclosure 93 to hermetically seal the enclosure. The by-pass switch 50 for each phase has an operating handle 102 rotatably mounted on door 94 and accessible from the exterior of the self-enclosed stationary induction unit. In alternative embodiments the three by-pass switches 50 are housed in individually sealed enclosures, and in still other embodiments the by-pass switches 50 are immersed in insulating dielectric 20 within main tank 10 and operable by handles extending through the tank sidewall and accessible from the exterior of the self-contained unit.

Each by-pass switch 50 has three movable contacts 49, 51, and 53 mounted on a rotatable insulating member 103 and actuable simultaneously by handle 102. Each movable contact 49, 51, and 53 is adapted to bridge between two radially spaced apart arcuate stationary contacts. Movable contact 49 normally electrically commons arcuate stationary contacts 105 and 106, as shown in solid lines in FIG. 4, to connect the ungrounded end of shunt winding SH3 and reversing switch movable contact 69 to secondary bushing terminal X3 as explained hereinbefore. Movable contact 51 engages arcuate stationary contact 107 but is normally isolated from stationary contact 108. Movable contact 53 normally electrically commons stationary arcuate contacts 74 and 75 to connect one end of transformer secondary winding S3 to the midtap of bridging reactor 58. It will thus be apparent that in the normal "A" position, by-pass switch 50 connects one end of the ratio adjusting means, i.e., midtap of preventive autotransformer 58, to transformer secondary phase winding S3 and connects the other end, i.e., movable contact 69 of reversing switch 33, and shunt winding SH3 to transformer secondary bushing terminal X3.

Handle 102 of each phase by-pass switch 50 is rotated clockwise to actuate the movable contacts 49, 51, and 53 from the normal "A" position shown in full lines to the intermediate, or by-pass position "B," shown in dotted lines in FIG. 4. The by-pass switch 50 is illustrated in the normal, or open, "A" position in FIGS. 3 and 4 and in the grounded, or closed, "C" position in FIGS. 1, 2, and 8–10. In the by-pass "B" position, movable contact 49 continues to engage both stationary contacts 105 and 106 to connect the shunt winding SH3 and the ratio adjusting means to secondary bushing terminal X3; movable contact 53 again engages both arcuate stationary contacts 74 and 75 to continue to connect transformer secondary winding S3 to the midtap of bridging reactor 58; and movable contact 51 electrically commons arcuate stationary contacts 107 and 108 to connect transformer secondary phase winding S3 directly to transformer secondary bushing terminal X3, thus by-passing the voltage regulating means 31, in a by-pass circuit that may be traced from winding S3, conductor 54, stationary contact 74, conductor 110 connecting by-pass switch stationary contacts 74 and 108, stationary contact 108, movable contact 51, stationary contact 107, conductor 111 connecting stationary contacts 105 and 107, stationary contact 105, and conductor 52 to bushing terminal X3. It will be noted that in the by-pass "B" position, the voltage regulating means 31 for phase 3 is by-passed and power is delivered from transformer secondary winding S3 to the phase load over leads connected to secondary bushing terminals X3 and X0. Thus in moving the by-pass switch from the normal, or open, position to the grounded, or closed, position, a by-pass circuit is established before the regulating windings are disconnected and consequently interruption of customer service is avoided.

Continued rotation of handle 102 of by-pass switch 50 actuates the three movable contacts 49, 51, and 53 to the closed, or grounded, "C" position shown in FIGS. 1, 2 and 8–10 and also shown in dot-dash lines in FIG. 4 wherein movable contact 49 is isolated from stationary contact 105 but is in engagement with both stationary contact 106 and a grounded stationary contact 113 to disconnect both shunt winding SH3 and movable contact 69 of reversing switch 33 from bushing terminal X3 and to connect them to ground; wherein movable contact 51 continues to be in engagement with stationary contacts 107 and 108 to by-pass the voltage regulating means 31; and wherein movable contact 53 is isolated from stationary contact 74 but engages a grounded stationary contact 114 to disconnect the midtap of preventive autotransformer from transformer secondary winding S3 and to connect it to ground. It will be appreciated that in the closed, or grounded, "C" postion of by-pass switch 50, the shunt winding SH3, the tap changer 39, the reversing switch 33, the preventive autotransformer 58, and the series winding SE3 are completely isolated electrically from the transformer secondary winding S3 and from the phase line connected to bushing terminal X3 and further that both ends of shunt winding SH3 are grounded and both ends of the ratio adjusting means are grounded at the midtap of the preventive autotransformer 58 and the movable contact 69 of reversing switch 33. Consequently, after opening valve 61 to drain the oil 20 from compartment 36, a workman can remove door 38 sealing compartment 36 and inspect and service the load tap changing mechanism including tap changer 39 and drive means 75 with perfect safety while the transformer 16 remains energized and continues to deliver uninterrupted three phase power. Thus maintenance and inspection of the load tap changing mechanism 31 of one phase is possible while the load tap changing mechanisms of the other two phases continue in normal operation.

In order to further insure the safety of the operator and to give visual assurance of complete safety for maintenance personnel, grounding lug means accessible through aperture 35 in compartment 36 normally closed by door 38 are provided to permit connecting external grounds to all of the windings associated with the regulating circuit. Two grounding lugs 117 and 118 (see FIG. 1) within compartment 36 accessible through aperture 35 are connected to the ends of the preventive autotransformer 58 at 117A and 118A as shown in FIG. 4, and two grounding lugs 119 and 120 within compartment 36 accessible through aperture 35 are connected to the ends of the series winding SE3 at 119A and 120A as shown in FIG. 4.

Figure 9:
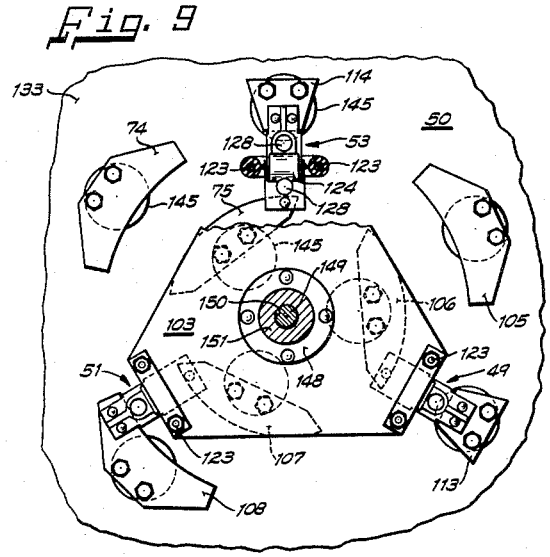
FIG. 9 is a vertical sectional view taken on line 9—9 of FIG. 8.

Each movable contact 49, 51, and 53 of by-pass switch 50 as best seen in FIGS. 8 and 9 is mounted on a pair of studs 123 secured to insulating member 103. Two pair of opposed contact buttons resiliently urged toward each other are provided at each end of a movable contact. Each movable contact 49, 51, and 53 includes two opposed, radially extending shunts 124 each comprising a plurality of resilient copper laminations. Each copper shunt 124 has a pair of contact buttons 125 secured, preferably by riveting, to the radially inward end thereof and a pair of arcing contact buttons 126 secured, preferably by riveting, to the radially outward end thereof. The two opposed copper shunts 124 are disposed with the contact buttons 125 in engagement and with the arcing contact buttons 126 in engagement, and pins 128 extend axially through the laminated copper shunts. Helical springs 129 surrounding the pins 128 beyond the copper shunts 124 and compressed between the copper shunts 124 and heads on the pins 108 resiliently urge the contact buttons 125 and 126 into engagement with opposite sides of the stationary contacts of the by-pass switch 50. Intermediate their ends the copper shunts 124 have arcuate portions which are urged by the springs 129 against a support member 130 disposed between the shunts 124 and having circumferentially extending portions secured to the mounting studs 123.

An aperture 132 (see FIG. 8) in the sidewall of casing 10 registering with the interior of enclosure 93 is sealed by a panel board 133 of low power factor, low loss dielectric material secured by bolts 134 to casing 10. A continuous resilient gasket 136 is compressed within a groove 137 in panel board 133 surrounding aperture 132 to seal the interior of enclosure 93 from the interior of casing 10. Electrical connections between the interior of tank 10 and the interior of enclosure 93 are made by conductor studs 139 surrounded by insulating sleeves 140 and extending through clearance apertures in panel board 133 and through axial bores in cylindrical insulating members 141 and 142 abutting against opposite sides of panel board 133. One end of a stud 139 threadably engages a metallic contact support member 145 disposed within enclosure 93 and the other end threadably engages a nut 146 within tank 10 to clamp the insulating members 141 and 142 against panel board 133. The stationary contacts 74, 75, 105, 106, 107, 108, 113, and 114 of by-pass switch 50 within enclosure 93 are secured by bolts to the metallic support members 145, and conductors such as 52 and 56 are secured to the conductor studs 139 within casing 10.

Insulating member 103 of by-pass switch 50 is secured to the annular flange 148 of a stub shaft 149 rotatably journalled within the axial bore 150 in a ribbed support bracket 151 which is secured at its ends by bolts 153 to projections 154 welded to the interior of enclosure 93 adjacent the aperture 95. Handle 102 of by-pass switch 50 is secured by a pin 155 to a rotatable shaft 156 extending through door 94 coaxially with stub shaft 149 and operatively and releasably connected thereto by a pin 160 extending through the end of shaft 156 and slidably received within diametrically opposed, axially extending grooves 161 in a tubular coupling member 162 which is secured by a pin 163 to stub shaft 149. The sliding engagement between pin 160 and diametrically opposed grooves 161 in coupling member 162 provides a releasable connection between shafts 149 and 156 to permit disengagement between handle 102 and the by-pass switch 50 when door 94 is removed from enclosure 93.

A cup-shaped metallic support member 165 extending through an aperture in door 94 and welded thereto in coaxial relation with shaft 149 has an axial bore in the bottom wall 116 accomodating shaft 156. A snap ring 167 fitting within a circumferential groove in shaft 156 and abutting against bottom wall 166 prevents inward movement of shaft 156. Packing rings 169 compressed within cup-shaped member 165 by a closure member 170 threadably engaging the open end of member 165 provides a seal for rotatable shaft 156 to prevent leakage of insulating dielectric from within enclosure 93.

The by-pass switch 50 of each phase is interlocked with the phase tap changer 39 so that the by-pass switch 50 can only be operated when both movable contacts 41 and 42 of tap changer 39 are on the "neutral" stationary contact 172 of the ratio adjuster. The by-pass switch 50 may be required to interrupt circulating current resulting from adjacent taps being bridged if it were operated when tap changer 39 is off neutral. The neutral contact 172 is connected by conductor 70 to the ungrounded end of shunt winding SH3 and through movable contact 49 to the bushing terminal X3, and in the neutral position of tap changer 39 with both contacts 41 and 42 on neutral contact 172, the transformer secondary phase winding S3 is connected directly to the load terminal X3 through the preventive autotransformer 58. Consequently, the series winding SE3 is out of the circuit, and the by-pass switch 50 is only required to interrupt exciting current for the shunt winding SH3 which is still in the circuit. It will thus be appreciated that in the preferred embodiments the by-pass switch is in a separate oil-filled compartment 93 wherein it cannot contaminate the oil 20 in the main tank, and the by-pass switch 50 being insulated by dielectric fluid 20 can be substantially smaller in size than a conventional by-pass switch of the air disconnect type.

In the embodiment illustrated in the drawing a mechanical key interlock insures against possible operation of the by-pass switch 50 when the load tap changing is in any other position than neutral. One end of the rotatable shaft 173 (see FIGS. 1 and 7) of tap changer 39 on which movable contacts 41 and 42 are mounted is secured to a miter gear 174 which meshes with a miter gear 176 rigidly secured to a vertical shaft 177 rotatably supported in a sleeve bearing 179 rigidly secured by suitable means such as welding to the framework 180 of the ratio adjuster 39 within compartment 36. A disc 181 rigidly secured to shaft 177 is provided with an aperture 183 radially spaced from the axis thereof and adapted to only receive the axially reciprocable bolt 184 of a key interlock 185 mounted on the exterior of compartment 36 when shaft 177 is rotated to engage both movable contacts 41 and 42 with neutral contact 172. Normally the bolt 184 is retracted upwardly into key interlock 185 and is prevented by disc 181 from being moved downwardly, and in this upwardly retracted position of bolt 184 the key (not shown) cannot be removed from the interlock 185. Consequently the key can only be removed when the movable contacts 41 and 42 engage neutral contact 172 and disc 181 is oriented to permit bolt 184 to move downwardly into aperture 183.

Figure 10:
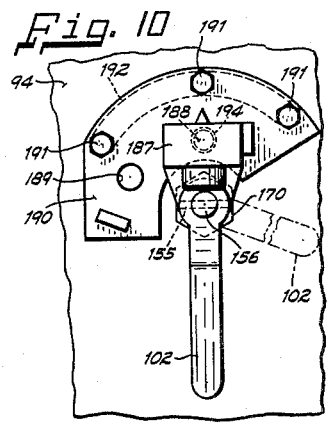
FIG. 10 is a detail view of the handle and key interlock for one of the by-pass switches.

As seen in FIGS. 8 and 10, the by-pass switch handle 102 is provided with a similar mechanical key interlock 187 operated by the key from interlock 185. In the normal, or open, position of by-pass switch 50, the horizontally reciprocable bolt 188 of interlock 187 fits into an opening 189 in a plate 190 secured by bolts 191 engaging internally threaded support studs 192 on cover 94. Consequently the handle 102 cannot be rotated clockwise to operate the by-pass switch 50 to the by-pass "B" and the closed "C" positions until the ratio adjuster 39 is in the neutral position and the operator can remove the key from interlock 185 on compartment 36 and insert it into interlock 187 on enclosure 93 to retract the horizontally reciprocable bolt 188 from within opening 189 in plate 190 and thus unlock the by-pass switch 50. It will also be appreciated that the mechanical key interlock assures that the by-pass switch is not moved from the closed position while the load tap changing equipment is being maintained. It is possible to operate each phase load tap changing mechanism for inspection and maintenance from an external control power supply when the mechanism is by-passed and isolated. However, before the tap changer 39 can be driven from an external supply, the key must be inserted in interlock 185 in order to retract bolt 184 and thus permit rotation of shaft 173 carrying movable contacts 41 and 42, and in order to accomplish this the operator must first remove key from by-pass switch handle interlock 187 which slides bolt 188 into an aperture 194 on plate 190 and thus locks the by-pass switch 50 in the closed, or grounded, position.

The circuit diagrams of FIGS. 3 and 4 are applicable to embodiments having three-phase regulation wherein all of the phase tap changers 39 are simultaneously operated. In such three-phase load tap changing transformers, the shunt and series windings may either be on a three-phase magnetic core in a manner similar to conventional three-phase load tap changing apparatus or may be on individual single phase autotransformer core and coil assemblies 43, and further the by-pass switches 50 of all three phases are gang operated from a single operating handle accessible from the exterior of the self-contained unit.

FIG. 11 illustrates a by-pass switch 50' for a single phase of a three phase self-contained stationary induction unit for an ungrounded neutral Y connected power system. The by-pass switch 50' is substantially identical to that illustrated in FIG. 4 for the embodiments of FIGS. 1–10 and like parts are given the same reference numerals.

Both ends of shunt winding SH3, the neutral N, conductor 46 and bushing terminal X0 are ungrounded. Consequently a shift in the floating neutral due to a fault could introduce potentials in shunt winding SR3 dangerous to maintenance personnel even if the voltage regulating equipment were by-passed by the switch 50 of the embodiment of FIGS. 1–10. A fourth movable contact 193 provided on rotatable insulating member 103 of switch 50' normally electrically commons arcuate stationary contacts 194 and 195. Stationary contact 194 is connected by conductor 197 to one end of shunt winding SH3 and stationary contact 195 is connected by conductor 198 to ungrounded neutral N and to conductor 46 leading to bushing terminal X0. Consequently, in the open position of the by-pass switch 50' the shunt winding SH3 is connected between bushing terminals X3 and X0 through both movable contacts 49 and 193. In the closed "C" position of the by-pass switch 50', movable contact 193 is disengaged from stationary contact 195 to disconnect the shunt winding SH3 from the neutral N and bushing terminal X0, and movable contact 193 engages a grounded stationary contact 199 to ground the end of shunt winding SH3 connected to conductor 197. This disconnection and grounding of the neutral end of shunt winding SH3 by movable contact 193 protects maintenance personnel against the danger of high potentials introduced into shunt winding SH3 resulting from shift of the floating neutral incident to a fault. FIG. 11 indicates by dotted lines that the by-pass switches of all three phases are ganged as would occur in a three phase load tap changing transformer, but it will be appreciated that the embodiment of FIG. 11 is also applicable to stationary induction apparatus having single phase regulation wherein the by-pass switches are individually operated.

Although the invention has been described with reference to a three phase transformer having single phase voltage regulators of the single core autotransformer type, the invention also comprehends other stationary induction apparatus such as a three phase regulator with individual phase regulation, a three phase autotransformer type regulator having three common windings and three tapped series windings, as well as unitary stationary induction apparatus where the current rating exceeds that of the load tap changing mechanisms and necessitates the use of regulators of the two-core type having an exciting transformer and a series transformer. FIGS. 12 and 13 illustrate circuit arrangements for individual phase by-pass switches in self-contained stationary induction units having regulators of the two-core type including a series transformer, and parts similar to those of the embodiments of FIGS. 1–10 and FIG. 11 are given like reference numerals.

FIG. 12 shows a single phase of a self-contained three phase stationary induction apparatus in accordance with the invention wherein the three Y connected transformer secondary windings are electrically commoned to define a neutral N and grounded. An exciting transformer ET3 immersed in the insulating liquid 20 within the main casing 10 includes a winding 201 having taps connected to stationary contacts of a ratio adjuster 39 within a sealed compartment 36 on the casing 10. One end of exciting transformer tapped winding 201 is connected to the grounded neutral N and the other end is connected by a conductor 202 to one winding 203 of a series transformer ST3 immersed in insulating dielectric 20 within the main casing 10. Exciting winding 204 of the series transformer ST3 is inductively related to winding 203 and is energized from the exciting transformer ET3 through the movable contacts 41 and 42 of the tap changer 39 in a circuit that may be traced from one side of winding 204, a conductor 205 connecting winding 204 to movable contact 69 of reversing switch 33, movable contact 69, stationary contact 63 or 64 of reversing switch 33, part of exciting transformer tapped winding 201, a stationary contact 40 of ratio adjuster 39, movable contacts 41 and 42 of tap changer 39, preventive autotransformer 58, and conductor 206 connecting the midtap of bridging reactor 58 to the other side of winding 204. A by-pass switch immersed in liquid dielectric 20 within an enclosure 93 on casing 10 has three ganged movable contacts 208, 209, and 210 mounted on insulating member 103. Contact 208 normally connects series transformer winding 203 to bushing terminal X3; contact 209 is normally open, and contact 210 normally connects exciting transformer tapped winding 201 in shunt to transformer secondary phase winding S3. When the by-pass switch is moved to the grounded, or closed, position, movable contact 208 disconnects the series transformer winding 203 from the phase bushing terminal X3 and grounds one end of winding 203; movable contact 209 by-passes the voltage regulating equipment and connects transformer secondary winding S3 directly to bushing terminal X3; and movable contact 210 opens the circuit connecting the exciting transformer tapped winding 201 in shunt with transformer secondary winding S3 and grounds one end of tapped winding 201 and exciting winding 203 of the series transformer. It will be noted that in the closed position of the by-pass switch, both the exciting transformer tapped winding 201 and series transformer winding 203 are isolated from the load lines and that both ends of these windings are grounded to insure the safety of maintenance personnel. The embodiment of FIG. 12 may require a by-pass switch of a heavier current rating than that of the load tap changing apparatus.

The by-pass switch having four ganged, simultaneously movable contacts 211, 212, 213, and 214 of the embodiment of FIG. 13 may have a current rating equal to that of the load tap changing apparatus. Movable contacts 211 and 212 normally connect the ends of series transformer exciting winding 204 to the midtap of bridging reactor 58 and to the movable contact 69 of reversing switch 33 respectively to complete the energizing circuit to the series transformer; movable contact 213 is normally open; and movable contact 214 normally connects the tapped winding 201 of the exciting transformer in shunt to the transformer secondary phase winding S3. When the by-pass switch is actuated to the closed position, movable contacts 211 and 212 disconnect the ends of series transformer exciting winding 203 and ground the ends of the ratio adjusting means at the midtap of preventive autotransformer 58 and at the movable contact 69 of the reversing switch 33. Movable contact 213 in the closed position short circuits series transformer exciting winding 204 to thus by-pass the regulating apparatus, and movable contact 214 disconnects and grounds the tapped winding 201 of the exciting transformer.

Although the embodiments including series transformers have been described with reference to three phase power transformers, it will be appreciated that the invention also comprehends other stationary induction apparatus such as three phase regulators.

While only a few embodiments of the invention have been illustrated and described, many modifications and variations thereof will be apparent to those skilled in the art, and consequently it is intended in the appended claims to cover all such modifications and variations as fall within the true spirit and scope of the invention.

We claim:

1. In a unitary three phase stationary induction apparatus, in combination, a casing, sealed compartments on said casing, insulating dielectric within said casing and said compartments, a three phase transformer core and coil assembly including a plurality of transformer windings, one being associated with each of said phases, immersed in said dielectric within said casing, autotransformer voltage regulating means having associated with each of said phases magnetic core means linked by a series winding and a shunt winding one of which has taps immersed in said dielectric within said casing, a tap changer having stationary contacts connected to said taps immersed in said dielectric within one of said compartments, and a by-pass switch immersed in said dielectric and normally connecting said voltage regulating means between said transformer winding of said phase and the load side of said apparatus and completing electrical circuits to said shunt and series windings and being operable from the exterior of said apparatus to by-pass said voltage regulating means and to disconnect said series and shunt windings and to ground the input and output ends of said voltage regulating means, whereby the voltage regulating means of one phase may be safely inspected and serviced while said apparatus continues to supply uninterrupted three phase power.

2. In a unitary three phase stationary induction apparatus having a source side and a load side, in combination, a casing, sealed compartments on said casing, insulating dielectric within said casing and said compartments, a three phase transformer core and coil assembly including a plurality of transformer windings, one being associated with each of said phases, immersed in said dielectric within said casing, a plurality of voltage regulating means, one being associated with each of said phases and including a winding having taps immersed in said dielectric within said casing, a tap changer having stationary contacts connected to said taps immersed in said dielectric within one of said compartments, and a plurality of switches each of which being associated with one of said phases and immersed in said dielectric and normally connecting said voltage regulating means between said transformer winding of said phase and one side of said apparatus and being operable from the exterior of said apparatus to disconnect said winding having taps and to by-pass said voltage regulating means, whereby the tap changer of each phase may be safely inspected and serviced while said apparatus continues to supply three phase power.

3. In a unitary stationary induction apparatus having a source side and a load side, in combination, a casing, sealed compartment means on the exterior of said casing, insulating dielectric within said casing and said compartment means, voltage regulating means including a winding having taps immersed in said dielectric within said casing, a tap changer having stationary contacts connected to said taps immersed in said dielectric within said compartment means, and a switch immersed in said dielectric normally connecting said voltage regulating means between the source side and the load side of said apparatus and being operable from the exterior of said apparatus to by-pass said voltage regulating means.

4. In a unitary stationary induction apparatus having a source side and a load side, in combination, a casing, at least one sealed compartment on the exterior of said casing, insulating dielectric within said casing and said compartment, voltage regulating means including a pair of windings one of which is provided with taps immersed in said dielectric within said casing, a tap changer having stationary contacts connected to said taps immersed in said dielectric within said compartment, and a switch immersed in said dielectric normally connecting one of said windings in shunt and the other of said windings in series between the source side and the load side of said apparatus and being operable from the exterior of said apparatus to by-pass said voltage regulating means and to disconnect said windings.

5. In a unitary stationary induction apparatus, in combination, a casing, sealed compartments on the exterior of said casing, insulating dielectric within said casing and said compartments, load terminal means on said casing, voltage regulating means including a pair of windings immersed in said dielectric within said casing, one of said windings having taps, a tap changer having stationary contacts connected to said taps immersed in said dielectric within one of said compartments and a switch immersed in said dielectric and normally connecting one of said windings in a shunt circuit with said load terminal means and the other of said windings in a series circuit with said load terminal means and being operable from the exterior of said apparatus to disconnect said windings and to by-pass said voltage regulating means and to ground the input and output ends thereof.

6. In a stationary induction apparatus unit, in combination, a casing, sealed compartments on the exterior of said casing, insulating dielectric within said casing and said compartments, bushing means on said casing adapted to be connected to a load, voltage regulating means including a pair of windings immersed in said dielectric within said casing, one of said windings having taps, a ratio adjuster having stationary contacts connected to said taps immersed in said dielectric within said compartment, and a by-pass switch immersed in said dielectric and having at least three movable contacts the first of which is normally open and the second and third of which respectively normally connect one of said windings in a series circuit and the other of said windings in a shunt circuit across said bushing means, said switch being operable from the exterior of said unit to actuate said first contact to by-pass said voltage regulating means and to actuate said second and third contacts to open said series and said shunt circuits.

7. In a unitary stationary induction apparatus, in combination, a casing, sealed compartments on the exterior of said casing, insulating dielectric within said casing and said compartments, a transformer core and coil assembly including a magnetic core and a coil linking said core immersed in said dielectric within said casing, voltage regulating means including a pair of windings immersed in said dielectric within said casing, one of said windings having taps, a ratio adjuster having stationary contacts connected to said taps immersed in said dielectric within one of said compartments, and a switch immersed in said insulating dielectric normally connecting one of said windings in a circuit in series with said transformer coil and the other of said windings in a circuit in shunt with said transformer coil and being operable from the exterior of said apparatus to open said circuits to said windings and to by-pass said voltage regulating means.

8. In a unitary three phase stationary induction apparatus, in combination, a casing, sealed compartments on the exterior of said casing, insulating dielectric within said casing and said compartments, autotransformer voltage regulating means having associated with each of said phases a series winding and a shunt winding one of which has taps immersed in said dielectric within said casing, ratio adjusting means immersed in said dielectric within one of said compartments and having stationary contacts connected to said taps, and a by-pass switch immersed in said dielectric normally completing electrical circuits to said series and shunt windings and connecting said voltage regulating means between the source side and the load side of said apparatus and being operable from the exterior of said apparatus to disconnect said series and shunt windings of said phase and to by-pass said voltage regulating means, whereby the voltage regulating means of one phase may be safely inspected and serviced while said apparatus continues to supply uninterrupted three phase power.

9. In a unitary three phase stationary induction apparatus, in combination, a casing, sealed compartments on said casing, each of said compartments having a door, insulating dielectric within said casing and said compartments, a plurality of voltage regulating means, one being associated with each of said three phases, each of said voltage regulating means including a series winding and a shunt winding immersed in said dielectric within said casing, one of said windings having taps, a ratio adjuster having stationary contacts connected to said taps immersed in said dielectric within one of said compartments, a by-pass switch immersed in said dielectric and normally completing electrical circuits to said series and shunt windings and connecting said regulating means between the source side and the load side of said apparatus and being operable from the exterior of said apparatus to disconnect said series and shunt windings and to by-pass said voltage regulating means, and grounding lug means within said compartment connected to the input and output ends of said voltage regulating means and being accessible from the exterior of said apparatus through said door.

10. In a unitary three phase stationary induction apparatus, in combination, a casing, sealed compartments on said casing, each of said compartments having a door, insulating dielectric within said casing and said compartments, three phase transformer means immersed in said dielectric within said casing and including a plurality of windings one of which is associated with each of said phases, a plurality of voltage regulating means, one being associated with each of said phases, each voltage regulating means including a series winding having taps and a shunt winding immersed in said dielectric within said casing, a tap changer immersed in said dielectric within one of said compartments and having stationary contacts connected to said taps and movable contacts adapted to engage said stationary contacts, a preventive autotransformer having a midtap immersed in said dielectric within said casing and being connected at its ends to said movable contacts, a by-pass switch immersed in said dielectric and normally connecting said transformer phase winding to said midtap and said shunt winding and one end of said series winding to the load side of said apparatus and being operable from the exterior of said apparatus to connect said transformer phase winding directly to the load side of said apparatus and to by-pass said voltage regulating means, and grounding lug means within one of said compartments connected to the ends of said series winding and to the ends of said shunt winding and being accessible from the exterior of said apparatus through said door.

11. In a unitary stationary induction apparatus, in combination, a casing, sealed compartments on said casing, insulating dielectric within said casing and said compartments, voltage regulating means including a shunt winding and a series winding immersed in said dielectric within said casing, one of said windings having taps, a tap changer immersed in said dielectric within one of said compartments and having stationary contacts connected to said taps and a pair of movable contacts adapted to sequentially engage said stationary contacts, a preventive autotransformer having a midtap immersed in said dielectric within said casing and having the ends thereof connected to said movable contacts of said tap changer, a reversing switch immersed in said dielectric within one of said compartments including a pair of stationary contacts connected to the ends of said winding having taps and a movable contact adapted to alternatively engage said stationary contacts, and a by-pass switch immersed in said dielectric and normally completing electrical circuits to said series and shunt windings and connecting said voltage regulating means between the source side and the load side of said apparatus and being operable from the exterior of said apparatus to disconnect said series and shunt windings and to by-pass said voltage regulating means and to ground both said midtap of said preventive autotransformer and the movable contact of said reversing switch.

12. In a unitary three phase, stationary induction apparatus, in combination, a casing, sealed compartments on said casing, insulating dielectric within said casing and said compartments, a three phase core and coil assembly immersed in said dielectric within said casing including magnetic core means linked by a plurality of windings, one being associated with each of said phases, voltage regulating means associated with each of said phases including winding means having taps immersed in said dielectric within said casing, a ratio adjuster immersed in said dielectric within one of said compartments and having stationary contacts connected to said taps, a neutral stationary contact isolated from said tapped winding, and at least one movable contact adapted to engage said stationary contacts, said voltage regulating means associated with each of said phases also including an electrical switch immersed in said dielectric and normally connecting said voltage regulating means between said phase winding and the load side of said apparatus and being operable from the exterior of said apparatus to by-pass said voltage regulating means and to disconnect said winding means, said electrical switch and said ratio adjuster being interlocked so that said electrical switch can only operate when said movable switch engages said neutral contact.

13. In a unitary three phase stationary induction apparatus, in combination, a casing, sealed compartments on said casing each having a door permitting access to the interior thereof, insulating dielectric within said casing and said compartments, a three phase core and coil assembly including a plurality of windings, one being associated with each of said phases, immersed in said dielectric within said casing, three voltage regulating means, one being associated with each of said phases and including a winding having taps immersed in said dielectric within said casing, a tap changer having stationary contacts connected to said taps immersed in said dielectric within one of said compartments, a switch immersed in said dielectric and normally connecting said phase voltage regulating means between said phase winding and the load side of said apparatus and being operable from the exterior of said apparatus to by-pass said voltage regulating means and to disconnect said tapped winding, and grounding lug means within said one compartment accessible from the exterior of said apparatus through said door and electrically connected to the ends of said winding having taps, whereby the voltage regulating means of one phase may be safely inspected and serviced while said induction apparatus is electrically energized and delivers uninterrupted three phase power.

14. In a unitary three phase stationary induction apparatus, in combination, a casing, sealed compartment means on said casing, insulating dielectric within said casing and said compartment means, a three phase transformer immersed in said dielectric within said casing and including a magnetic core linked by primary and secondary windings for each of said phases, voltage regulating means having associated with each of said phases a pair of windings one of which has taps immersed in said dielectric within said casing, a tap changer having stationary contacts connected to said taps immersed in said dielectric within said compartment means, and a by-pass switch immersed in said dielectric normally connecting one of said windings in series and the other of said windings in shunt between said secondary winding of said phase and the load side of said apparatus and being operable to by-pass said voltage regulating means and to disconnect said windings, the by-pass switches of all three phases being ganged and operable simultaneously from the exterior of said apparatus.

15. In a unitary three phase stationary induction apparatus, in combination, a casing, sealed compartments on said casing, insulating dielectric in said casing and said compartments, a three phase transformer immersed in said dielectric within said casing and including a magnetic core linked by primary and secondary windings for each of said phases, voltage regulating means immersed in said dielectric within said casing and including magnetic core means, each phase having associated therewith a by-pass switch, ratio adjusting means, and a shunt winding linked with said magnetic core means, said ratio adjusting means including a series winding having taps linked with said magnetic core means and a tap changer having stationary contacts connected to said taps immersed in said dielectric within said compartment, said by-pass switch being immersed in said dielectric and normally connecting said ratio adjusting means between said transformer secondary phase winding and the load side of said apparatus and also connecting said shunt winding across the load side of said apparatus in shunt to the series arrangement of said transformer secondary winding of said phase and said ratio adjusting means of said phase and being operable to by-pass said voltage regulating means and connect said transformer secondary winding of said phase directly to said load side of said apparatus and to disconnect said series and shunt windings, the by-pass switches of all three phases being ganged and operable simultaneously from the exterior of said apparatus.

16. In a three phase self-contained stationary induction unit, in combination, a casing, sealed compartments on said casing, insulating dielectric within said casing and said compartments, a three phase transformer immersed in said dielectric within said casing including a magnetic core linked by primary and secondary windings for each of said phases, voltage regulating means including magnetic core means immersed in said dielectric within said casing and having associated with each phase a pair of windings one of which has taps linked with said magnetic core means, each phase also having associated therewith a ratio adjuster immersed in said dielectric within one of said compartments and having stationary contacts connected to said taps and a pair of movable contacts adapted to sequentially engage said stationary contacts, a preventive autotransformer having a midtap immersed in said dielectric within said casing and being connected at its ends to said movable contacts, and a by-pass switch immersed in said dielectric and having a first movable contact normally connecting said transformer secondary winding of said phase to said midtap, a second normally open movable contact, and a third movable contact normally connecting the other of said pair of windings in shunt to the load side of said apparatus, said by-pass switch being operable to a second position wherein said midtap is disconnected and grounded by said first movable contact, said second movable contact completes an electrical circuit to connect said transformer secondary phase winding directly to the load side of said apparatus, and said third movable contact disconnects and grounds said other winding, the by-pass switches of all three phases being ganged and operable simultaneously from the exterior of said unit.

17. In a unitary three phase stationary induction apparatus, in combination, a casing, sealed compartments on said casing, insulating dielectric within said casing and said compartments, a three phase transformer immersed in said dielectric within said casing and including a magnetic core linked by primary and secondary windings for each of said phases, a plurality of voltage regulating means, one being associated with each of said phases and including a winding having taps immersed in said dielectric within said casing and a tap changer immersed in said dielectric within one of said compartments and having stationary contacts connected to said taps, a neutral stationary contact isolated from said tapped winding, and at least one movable contact adapted to sequentially engage said stationary contacts, each of said phases also having associated therewith an electrical switch immersed in said dielectric and normally connecting said voltage regulating means of said phase between said transformer secondary winding of said phase and the load side of said apparatus and being operable only when said movable contact engages said neutral stationary contact to by-pass said voltage regulating means, and means accessible from the exterior of said apparatus for ganging and simultaneously operating the by-pass switches of all three phases.

18. In a unitary three phase stationary induction apparatus, in combination, a casing, sealed compartments on said casing each having a door, autotransformer voltage regulating means including magnetic core means immersed in said dielectric within said casing and having associated with each of said phases a series and a shunt winding one of which has taps linked with said magnetic core means, a ratio adjuster immersed in said dielectric within one of said compartments and having stationary contacts connected to said taps and a pair of movable contacts adapted to engage said stationary contacts, a preventive autotransformer having a midtap immersed in said dielectric within said casing and being connected at its ends to said movable contacts, and a by-pass switch having a plurality of movable contacts immersed in said liquid dielectric and being operable from the exterior of said casing between a first position wherein said movable contacts of said switch complete energizing circuits to said shunt and series windings and also connect said voltage regulating means between the source and the load sides of said apparatus and a second position wherein said series and shunt windings are disconnected and said switch movable contacts ground said midtap and shunt winding, and a plurality of metallic grounding lugs within said one compartment accessible through said door, one of said lugs being connected to each end of said series winding and to each end of said preventive autotransformer.

19. In a unitary three phase stationary induction apparatus, in combination, a casing, sealed compartments on said casing, insulating dielectric within said casing and said compartments, a plurality of voltage regulating means, one being associated with each phase and including an exciting transformer having at least one tapped winding immersed in said dielectric within said casing, a tap changer immersed in said dielectric within one of said compartments and having stationary contacts connected to said taps and at least one movable contact adapted to sequentially engage said stationary contacts, said voltage regulating means also having associated with each said phase a series transformer immersed in said dielectric within said casing and having a pair of windings one of which is normally energized from said tapped winding through said movable contact of said tap changer, and a by-pass switch immersed in said dielectric and normally connecting said tapped winding in shunt across the source side of said apparatus and also normally completing an electrical circuit to one winding of said series transformer to connect said voltage regulating means between the source and load sides of said apparatus and being operable from the exterior of said unit to disconnect and ground one end of said tapped winding and to disconnect said one winding of said series transformer and to by-pass said voltage regulating means.

20. In a unitary stationary induction apparatus, in combination, a casing, at least one sealed compartment on said casing, insulating dielectric within said casing and said compartment, a transformer core and coil assembly immersed in said dielectric within said casing and including a magnetic core linked by a primary winding and a secondary winding for each phase of said apparatus, voltage regulating means including in each phase of said apparatus an exciting transformer immersed in said dielectric within said casing and having at least one winding provided with taps, a series transformer having a pair of windings immersed in said dielectric within said casing, a ratio adjuster immersed in said dielectric within said compartment and having stationary contacts connected to said taps and a pair of movable contacts adapted to sequentially engage said stationary contacts, a bridging reactor having a midtap immersed in said dielectric within said casing and connected at its ends to said movable contacts, a reversing switch immersed in said dielectric within said compartment and having a pair of stationary contacts connected to the ends of said tapped winding and a movable contact adapted to alternately engage said reversing switch stationary contacts, one winding of said series transformer being normally connected between said midtap and said movable contact of said reversing switch, and a by-pass switch immersed in said dielectric and normally connecting said tapped winding in shunt with said transformer secondary winding and completing a circuit to the other winding of said series transformer to connect said voltage regulating means between the source and load sides of said apparatus and being operable from the exterior of said apparatus to disconnect and ground said tapped winding and to by-pass said voltage regulating means.

21. In a unitary stationary induction apparatus, in combination, a casing, at least one sealed compartment on said casing, insulating dielectric within said casing and said compartment, a transformer core and coil assembly immersed in said dielectric within said casing and including a magnetic core linked by a primary winding and a secondary winding, voltage regulating means including an exciting transformer immersed in said dielectric within said casing and having at least one winding provided with taps, a tap changer immersed in said dielectric within said compartment and having stationary contacts connected to said taps and at least one movable contact adapted to sequentially engage said stationary contacts, a series transformer immersed in said dielectric within said casing and having a pair of windings, and a by-pass switch immersed in said dielectric within said casing and normally connecting said tapped winding of said exciting transformer in shunt to said secondary winding and completing an electrical circuit to one winding of said series transformer to connect said voltage regulating means between said transformer secondary winding and the load side of said apparatus and being operable from the exterior of said apparatus to disconnect said tapped winding and said one winding of said series transformer and to by-pass said voltage regulating means.

22. In a unitary three phase stationary induction apparatus, in combination, a casing, sealed compartments on said casing, insulating dielectric within said casing and said compartments, a plurality of means for varying the voltage between the source side and the load side of said apparatus, one of said means being associated with each phase of said apparatus and including an exciting transformer, a series transformer, a tap changer, and a by-pass switch, said exciting transformer being immersed in said dielectric within said casing and having at least one tapped winding, said tap changer being immersed in said dielectric within one of said compartments and having stationary contacts connected to said taps and at least one movable contact adapted to sequentially engage said stationary contacts, said series transformer being immersed in said dielectric within said casing and having a pair of windings one of which is normally energized from said tapped winding through said movable contact of said tap changer, said by-pass switch being immersed in said dielectric within said apparatus and being operable from the exterior of said apparatus to by-pass said voltage regulating means.

23. In a self-contained stationary induction apparatus, in combination, a casing, at least one sealed compartment on said casing, insulating dielectric within said casing and said compartment, a transformer core and coil assembly including a magnetic core linked by primary and secondary coils immersed in said dielectric within said casing, an exciting transformer including at least one tapped winding immersed in said dielectric within said casing, a tap changer having stationary contacts connected to said taps and at least one movable contact adapted to sequentially engage said stationary contacts immersed in said dielectric within said compartment, a series transformer immersed in said dielectric within said casing and having a pair of inductively related windings one of which is energized from said exciting transformer through said movable contact, and a by-pass switch immersed in said dielectric and normally connecting said tapped winding in shunt to said transformer secondary coil and also normally connecting the other winding of said series transformer between said transformer secondary winding and the load side of said apparatus and being operable from the exterior of said apparatus to disconnect and ground said tapped winding and to disconnect said other winding of said series transformer and to connect said transformer secondary coil directly to the load side of said apparatus, thereby by-passing said voltage regulating means.

24. In a stationary induction unit, in combination, a casing, sealed compartments on said casing, insulating dielectric within said casing and said compartments, a transformer core and coil assembly including a magnetic core linked by primary and secondary coils immersed in said dielectric within said casing, an exciting transformer including at least one tapped winding immersed in said dielectric within said casing, a tap changer having stationary contacts connected to said taps and at least one movable contact adapted to sequentially engage said stationary contacts immersed in said dielectric within one of said compartments, a series transformer immersed in said dielectric within said casing and having a pair of inductively related windings one of which is connected to said secondary coil, and by-pass switch immersed in said dielectric and having a first movable contact normally connecting said tapped winding in shunt to said secondary coil, a normally open second movable contact, and a third movable contact adapted to complete a circuit to energize the other winding of said series transformer from said exciting transformer through said movable contact of said tap changer and being operable from the exterior of said unit to actuate said first movable contact to disconnect and ground said tapped winding, to actuate said second movable contact to short circuit said other winding of said series transformer, and to actuate said third contact to open the circuit to and to ground said tap changer.

25. In a unitary three phase stationary induction apparatus, in combination, a casing, sealed compartments on said casing, liquid dielectric within said casing and said compartments, a three phase transformer core and coil assembly having primary and secondary windings immersed in said dielectric within said casing, primary and secondary bushings on said casing associated with said primary and secondary windings respectively, a plurality of single phase autotransformer voltage regulating means, one being associated with each phase, each voltage regulating means including a core and coil assembly immersed in said dielectric within said casing and having a shunt winding, a series winding with taps, a current coil, and a potential coil, each single phase voltage regulating means also including a bridging reactor immersed in said dielectric within said casing, a ratio adjuster immersed in said dielectric within one of said compartments and having stationary contacts connected to said taps and movable contacts connected to the ends of said bridging reactor, drive means for actuating said movable contacts, means responsive to signals from said current and potential coils for controlling said drive means, and a by-pass switch having at least two positions, said by-pass switch when in one position connecting said voltage regulating means between the transformer secondary winding of said phase and the corresponding secondary bushing and also connecting said shunt winding to said secondary bushing in shunt across the load side of said apparatus, said by-pass switch when operated to a second position connecting said transformer secondary winding directly to said secondary bushing, said by-pass switch being immersed in said liquid dielectric and being operable from the exterior of said casing.

26. In a unitary three phase stationary induction apparatus having single phase regulation, in combination, a casing, sealed compartments on said casing, liquid dielectric within said casing and said compartments, a three phase transformer core and coil having magnetic core means linked by primary and secondary windings for each of said phases immersed in said dielectric within said casing, a plurality of voltage regulating means, one being associated with each phase of said transformer, each voltage regulating means including an autotransformer immersed in said dielectric within said casing and having a shunt winding and a series winding one of which is provided with taps, each voltage regulating means also including an electrical switch having at least two positions and a ratio adjuster immersed in said dielectric within one of said compartments and having stationary contacts connected to said taps and at least one movable contact adapted to sequentially engage said stationary contacts, said switch when in one position connecting said voltage regulating means between said transformer secondary winding of said phase and the load side of said apparatus, said switch when operated to a second position connecting said transformer secondary winding of said phase to said load side of said apparatus in a circuit by-passing said voltage regulating means, said switch being immersed in said liquid dielectric and being operable from the exterior of said apparatus.

27. In a unitary stationary induction apparatus for supplying a three phase ungrounded neutral load, in combination, a casing, sealed compartments on said casing, insulating dielectric within said casing and said compartments, a plurality of bushings on said casing, one being associated with each of said phases, a three phase transformer including magnetic core means linked by primary and secondary coils for each of said phases immersed in said dielectric within said casing, the secondary coils of said three phases being commoned to define a neutral, a plurality of voltage regulating means, one being associated with each of said phases, each voltage regulating means including an autotransformer having a shunt winding and a tapped series winding immersed in said dielectric within said casing, a tap changer immersed in said dielectric within one of said compartments and having stationary contacts connected to said taps of said series winding and at least one movable contact adapted to sequentially engage said stationary contacts, and a by-pass switch immersed in said dielectric normally connecting said voltage regulating means between said transformer secondary coil of said phase and said phase bushing and also connecting said shunt winding between said phase bushing and said neutral, said by-pass switch being operable from the exterior of said apparatus to connect said transformer secondary coil of said phase to said phase bushing in a circuit by-passing said voltage regulating means and to disconnect said series winding and to disconnect said shunt winding from said neutral and from said phase bushing and to ground both ends thereof.

28. In a unitary three phase stationary induction apparatus for supplying a three phase ungrounded neutral load, in combination, a casing, sealed compartments on said casing, insulating dielectric within said casing and said compartments, a plurality of voltage regulating means, one being associated with each of said phases, each of said voltage regulating means including magnetic core means linked by a plurality of windings one of which has taps immersed in said dielectric within said casing, a tap changer having stationary contacts connected to said taps immersed in said dielectric within one of said compartments, and a by-pass switch immersed in said dielectric and normally connecting said voltage regulating means between the source and load sides of said apparatus and connecting one of said windings to said ungrounded neutral and in shunt across one side of said apparatus and also completing an electrical circuit to the other of said windings and being operable from the exterior of said apparatus to disconnect said one winding and to ground both ends thereof and to by-pass said voltage regulating means and to ground both ends thereof.

29. In a unitary three phase stationary induction apparatus for supplying a three phase ungrounded neutral load, in combination, a casing, sealed compartments on said casing, insulating dielectric within said casing and said compartments, a plurality of voltage regulating means, one being associated with each of said phases, each of said voltage regulating means including an autotransformer having a series winding provided with taps and a shunt winding immersed in said dielectric within said casing, a ratio adjuster having stationary contacts connected to said taps immersed in said dielectric within one of said compartments and a by-pass switch immersed in said dielectric normally connecting said voltage regulating means between the source side and the load side of said apparatus and also connecting said shunt winding to said ungrounded neutral and in shunt across the load side of said apparatus and being operable from the exterior of said apparatus to disconnect said shunt winding from said neutral and to ground both ends thereof and to by-pass said voltage regulating means and to ground both ends thereof.

30. In a unitary three phase stationary induction apparatus, in combination, a casing, sealed compartments on said casing, insulating dielectric within said casing and said compartments, a three phase transformer including magnetic core means linked by primary and secondary coils for each of said phases immersed in said dielectric within said casing, a plurality of transformer voltage regulating means, one being associated with each said phase and including a pair of windings one of which has taps immersed in said dielectric within said casing, a tap changer immersed in said dielectric within one of said compartments and having stationary contacts connected to said taps and a movable contact adapted to sequentially engage said stationary contacts, and a by-pass switch immersed in said dielectric and normally connecting said voltage regulating means between said transformer secondary phase coil and the load side of said apparatus in an electrical circuit including said movable contact and one of said windings and also connecting the other of said windings in shunt across one side of said apparatus and being operable from the exterior of said apparatus to a second position wherein said windings are disconnected and said transformer secondary phase coil is connected to the load side of said apparatus in an electrical circuit by-passing said voltage regulating means.

31. In a unitary stationary induction apparatus in accordance with claim 30 wherein said tap changer includes a neutral stationary contact isolated from said tapped winding and said tap changer and said by-pass switch are interlocked so that said by-pass can only operate when said movable contact engages said neutral contact.

32. In a self-contained three phase stationary induction apparatus, in combination, a casing, sealed compartments on said casing, insulating dielectric within said casing and said compartments, three phase transformer means including primary and secondary coils associated with each of said phases immersed in said dielectric within said casing, a plurality of regulating transformers, one being associated with each of said phases and including a pair of windings one of which has taps immersed in said dielectric within said casing, a tap changer having stationary contacts connected to said taps and a movable contact adapted to sequentially engage said stationary contacts immersed in said dielectric within one of said compartments, and a by-pass switch immersed in said dielectric and normally connecting said regulating transformer between said transformer secondary phase coil and the load side of said apparatus in an electrical circuit including said movable contact and one of said windings and also normally connecting the other of said windings in shunt across one side of said regulating transformer and being operable from the exterior of said apparatus to disconnect said windings and to ground said other winding and to by-pass said regulating transformer and to ground the ends thereof.

33. A unitary three phase stationary induction apparatus having a source side and a load side comprising, in combination, a casing, sealed compartment means on the exterior of said casing, insulating dielectric fluid within said casing and said compartment means, a three phase transformer core and coil assembly including a magnetic core linked by transformer windings associated with each of said phases immersed in said dielectric fluid within said casing, three voltage regulating means each of which is associated with one of said phases and includes a winding provided with taps immersed in said dielectric within said casing, three current interrupting contact means each of which is associated with one of said phases and is immersed in said dielectric fluid within said compartment means, and three by-pass switch means one of which is associated with each of said phases and is immersed in said dielectric fluid and normally connects said voltage regulating means and said current interrupting contact means of said phase between said transformer winding of said phase and the load side of said apparatus and is operable from the exterior of said casing to by-pass said current interrupting contact means of said phase, whereby said current interrupting contact means of each phase may be inspected and serviced while said stationary induction apparatus continues to supply three phase power.

34. A unitary stationary induction apparatus having a source side and a load side comprising, in combination, a casing, at least one sealed compartment on said casing, insulating dielectric within said casing and said compartment, a transformer core and coil assembly including a magnetic core linked by a transformer winding immersed in said dielectric within said casing, voltage regulating tap changer means including a winding having taps immersed in said dielectric within said casing, current interrupting contact means immersed in said dielectric within said compartment, and a by-pass switch immersed in said dielectric and normally connecting said voltage regulating tap changer means and said current interrupting contact means between said transformer winding and the load side of said apparatus and being operable from the exterior of said casing to bypass said voltage regulating tap changer means and said current interrupting contacts and connect said transformer winding to said load side of said apparatus, whereby said current interrupting contacts can be inspected and repaired while said stationary induction apparatus remains energized.

35. In a unitary stationary induction apparatus having a source side and a load side, in combination, a casing, sealed compartment means on said casing, insulating dielectric within said casing and said compartment means, voltage regulating tap changer means including a winding having taps immersed in said dielectric within said casing, and current interrupting contact means immersed in said dielectric within said compartment means, and a switch immersed in said insulating dielectric normally connecting said voltage regulating means including said current interrupting contact means between the source side and the load side of said apparatus and being operable from the exterior of said casing to bypass and ground said current interrupting contact means.

36. A unitary, three phase, stationary induction apparatus having a source side and a load side, comprising, in combination, a transformer casing, three sealed containers secured to said casing, insulating dielectric within said casing and said containers, a three phase transformer core and coil assembly including a transformer winding associated with each phase immersed in said dielectric within said casing, three voltage regulating means each being associated with one of said phases and having magnetic core means, a winding provided with taps, and a tap changer having stationary contacts connected to said taps and a movable contact adapted to sequentially engage said stationary contacts and being immersed in said dielectric within one of said containers, and three by-pass switches mounted on said casing, each by-pass switch being associated with one of said phases and normally completing an energizing circuit to said winding of said phase having taps and connecting said voltage regulating means of said phase between said transformer winding of said phase and the load side of said stationary induction apparatus, whereby the load voltage of said three phases may be independently regulated, each said by-pass switch being operable from the exterior of said casing to open said energizing circuit to said winding having taps and to by-pass said voltage regulating means of said phase and to connect said transformer winding of said phase to said load side of said stationary induction apparatus, whereby said voltage regulating means of each phase may be de-energized and said tap changer safely inspected and repaired without interrupting three phase service to the load.

37. In a unitary stationary induction apparatus having a source side and a load side, in combination, a casing, at least one sealed compartment on the exterior of said casing, insulating dielectric within said casing and said compartment, tap changer voltage regulating means including a magnetic core linked by a winding having taps immersed in dielectric within said casing, said tap changer voltage regulating means having current interrupting contacts immersed in said dielectric within said compartment, and a by-pass switch immersed in said dielectric and normally connecting said voltage regulating means including said current interrupting contacts between the source side and the load side of said apparatus and being operable from the exterior of said casing to by-pass said current interrupting contacts, said by-pass switch and said tap changer voltage regulating means being interlocked so that said tap changer voltage regulating means cannot be operated when said by-pass switch has been actuated to by-pass said current interrupting contacts.

38. In a unitary three phase stationary induction apparatus having a source side and a load side, sealed compartment means on said casing, insulating dielectric within said casing and said compartment means, a three phase core and coil assembly immersed in said dielectric within said casing including a magnetic core and three windings linked with said core and provided with taps and each being associated with one of said phases, three tap changers each of which is immersed in said dielectric within said compartment means and is associated with one of said phases and is provided with stationary contacts connected to said taps of said winding of said phase, and three by-pass switches immersed in said dielectric, each of said by-pass switches being associated with one of said phases and normally completing an electrical circuit to said winding of said phase and connecting said tap changer of said phase between the source side and the load side of said apparatus and being operable from the exterior of said casing to disconnect said winding and to by-pass said tap changer of said phase, the by-pass switches of all three phases being ganged and operable simultaneously from the exterior of said apparatus.

References Cited by the Examiner
UNITED STATES PATENTS

| | | | |
|---|---|---|---|
| 2,177,109 | 10/39 | Hill | 323—43.5 X |
| 2,560,002 | 7/51 | Sealey | 323—43.5 X |
| 2,713,126 | 7/55 | Sealey | 323—43.5 X |

LLOYD McCOLLUM, *Primary Examiner.*

MILTON O. HIRSHFIELD, *Examiner.*